United States Patent
Brandt et al.

(10) Patent No.: US 12,012,531 B2
(45) Date of Patent: Jun. 18, 2024

(54) POLYESTER POLYOL-BASED ADHESIVES ON THE BASIS OF FURANDICARBOXYLIC ACID OBTAINED FROM RENEWABLE RAW MATERIALS

(71) Applicant: Henkel AG & Co. KGaA, Duesseldorf (DE)

(72) Inventors: Adrian Brandt, Essen (DE); Horst Beck, Neuss (DE); Kerstin Schroeder, Grevenbroich/Wevelinghoven (DE); Alexander Kux, Monheim (DE); Dennis Bankmann, Duesseldorf (DE); Helga Garmann, Hilden (DE); Stefan Tomke, Oberhausen (DE); Timo Pasemann, Oberhausen (DE); Kerstin Russbuelt, Hilden (DE)

(73) Assignee: Henkel AG & Co. KGaA, Duesseldorf (DE)

(*) Notice: Subject to any disclaimer, the term of this patent is extended or adjusted under 35 U.S.C. 154(b) by 262 days.

(21) Appl. No.: 16/852,649

(22) Filed: Apr. 20, 2020

(65) Prior Publication Data

US 2020/0239751 A1 Jul. 30, 2020

Related U.S. Application Data

(63) Continuation of application No. PCT/EP2018/067759, filed on Jul. 2, 2018.

(30) Foreign Application Priority Data

Oct. 25, 2017 (EP) .................................... 17198208

(51) Int. Cl.

| | | |
|---|---|---|
| *C09J 175/06* | (2006.01) | |
| *B32B 7/12* | (2006.01) | |
| *B32B 15/085* | (2006.01) | |
| *B32B 15/09* | (2006.01) | |
| *B32B 15/20* | (2006.01) | |
| *B32B 27/32* | (2006.01) | |
| *B32B 27/36* | (2006.01) | |
| *B32B 37/12* | (2006.01) | |

(52) U.S. Cl.
CPC ............... *C09J 175/06* (2013.01); *B32B 7/12* (2013.01); *B32B 15/085* (2013.01); *B32B 15/09* (2013.01); *B32B 15/20* (2013.01); *B32B 27/32* (2013.01); *B32B 27/36* (2013.01); *B32B 37/12* (2013.01)

(58) Field of Classification Search
CPC ....................................................... C09J 175/06
See application file for complete search history.

(56) References Cited

U.S. PATENT DOCUMENTS

| | | |
|---|---|---|
| 10,428,245 B2 | 10/2019 | Michaud et al. |
| 2012/0220680 A1 | 8/2012 | Bastioli et al. |
| 2013/0171397 A1 | 7/2013 | Ghosh et al. |

FOREIGN PATENT DOCUMENTS

| | | | |
|---|---|---|---|
| CN | 104726051 A | 6/2015 | |
| CN | 106496500 A | 3/2017 | |
| CN | 112300744 A | 2/2021 | |
| EP | 2567996 A1 * | 3/2013 | ............. B32B 27/06 |
| EP | 2567996 A1 | 3/2013 | |
| JP | 2000038561 A | 2/2000 | |
| JP | 2004143314 A | 5/2004 | |
| JP | 2015120839 A | 7/2015 | |
| WO | 2013034305 A1 | 3/2013 | |
| WO | 2014054940 A2 | 4/2014 | |
| WO | 2015108026 A1 | 7/2015 | |
| WO | 2016053186 A1 | 4/2016 | |

OTHER PUBLICATIONS

International Search Report for International PCT Patent Application No. PCT/EP2018/067759 dated Sep. 28, 2018.
Synthese und Charakterisierung von Polyestern und Polyamiden auf der Basis von Furan-2,5-dicarbonsäure, Otto Grosshardt, Chemie Ingenieur Technik 2009, 81, No. 11.
A biocatalytic approach towards sustainable furanic-aliphatic polyesters, Yi Jiang, Polym. Chem., 2015, 6, 5198.

* cited by examiner

*Primary Examiner* — Daniel H Lee
(74) *Attorney, Agent, or Firm* — James E. Piotrowski

(57) ABSTRACT

The present invention relates to adhesives which contain a polyester polyol on the basis of furandicarboxylic acid obtained from renewable raw materials, and to a method for bonding substrates, in particular film-like substrates, using said adhesive.

15 Claims, No Drawings

POLYESTER POLYOL-BASED ADHESIVES ON THE BASIS OF FURANDICARBOXYLIC ACID OBTAINED FROM RENEWABLE RAW MATERIALS

The present invention relates to adhesives which contain a polyester polyol based on furandicarboxylic acid obtained from renewable raw materials, and to a method for bonding substrates, in particular film-like substrates, using the described adhesive.

Increased environmental awareness and limited resources for fossil raw materials have resulted in a new awareness of the sustainability of products. In the field of everyday objects and what are referred to as disposable products, efforts to replace common products, which are mostly based on petroleum, with alternatives made of renewable raw materials have come into the spotlight. The search for alternatives made of renewable raw materials for the most common chemicals that form the basis for the production of most everyday products poses the problem of identifying suitable sources that are able to provide the desired substances in the required quantity and with the required quality. It has also been observed that the physical properties of products obtained from renewable raw materials sometimes differ from those of conventional petroleum-based products and do not always reach the same standard. In addition, there are a number of fields in which only a limited amount of raw materials is available from the outset, for example due to legal regulations. One such field is, inter alia, the food industry, which is subject to strict conditions, particularly when it comes to food packaging. In general, there are only a few chemical compounds available that are considered to be safe from the point of view of food safety and health.

A need therefore exists for chemical compounds which can be prepared on the basis of renewable raw materials and which have properties comparable to those of the conventional compounds.

WO 2014/054940 describes polymers which have one or more groups derived from a diol and one or more groups derived from an acid, the acid being selected from dicarboxylic acid and carbonic acid and the diol compound being dimethylene isosorbide, dimethylene isomannide or dimethylene isoidide, i.e. the polymer is formed from building blocks that come from renewable sources, such as sugars.

US 2013/0171397 discloses polyesters which are prepared in whole or in part from biomass. The described polyesters have the desired physical and thermal properties in order to completely or partially replace polyesters from fossil sources.

However, the approaches described in the prior art do not take into account the fact that the need for sustainability is not limited to the finished products, but rather also plays a major role in the production and manufacturing process. For example, the fact that the principle of sustainability should also apply to auxiliaries used in the production of products, such as adhesives, is not taken into account. Therefore, a need exists for chemical compounds made from renewable raw materials that can be used in processing, for example as adhesives, and that have at least the same physical properties as corresponding petroleum-based compounds.

The object of the present invention is therefore to provide an adhesive of which the components are prepared at least partially on the basis of renewable raw materials, and which is also suitable for use in the food industry, especially for food packaging.

In the context of the present invention, it has surprisingly been found that this object is achieved by providing an adhesive which contains, as components, a polyester polyol based on furandicarboxylic acid which has been obtained from renewable raw materials.

Therefore, the present invention firstly relates to an adhesive for bonding plastics and/or metal substrates, which comprises at least one polyester polyol based on furandicarboxylic acid (FDCA) and at least one compound containing NCO groups, the furandicarboxylic acid used being obtained from renewable raw materials.

Within the meaning of the present invention, renewable raw materials are understood to mean organic raw materials that come from agricultural and forestry production, in particular raw materials of plant origin and biogenic waste products. Wood, natural fibers such as cotton, vegetable oils, sugar and starch, for example, can be used as renewable raw materials.

Suitable renewable raw materials for the preparation of furandicarboxylic acid are, for example, sugar or polysaccharides. The required $C_5$ sugar and polysaccharides are produced, inter alia, during degradation of biomass. Furandicarboxylic acid can be prepared, for example, by oxidizing hydroxymethylfurfural, which can be obtained in turn from the sugars isolated from the biomass.

An embodiment of the present invention in which the furandicarboxylic acid is obtained from sugars and/or polysaccharides, which preferably arise from the degradation of biomass, is therefore preferred.

Celluloses are another source of raw material from which furandicarboxylic acid can be prepared. Therefore, an embodiment in which the furandicarboxylic acid is prepared starting from cellulose and/or cellulose derivatives is alternatively preferred.

A. Polyester Polyol

The polyester polyol used in the adhesive according to the invention is preferably a reaction product from the reaction of furandicarboxylic acid with a polyol.

Within the meaning of the present invention, polyols are compounds which contain at least two active OH groups. The polyol is particularly preferably a diol or a triol.

There are no special requirements for the polyol used. Rather, a variety of polyols can be used, which allow the properties of the polyester polyol used to be individually adapted to the respective requirements.

The polyol is preferably selected from the group consisting of aliphatic polyols, polyester polyols and polyether polyols, in particular polycarbonate polyols, polycaprolactone polyols, polybutadiene polyols, polysulfide polyols and mixtures thereof.

Suitable polyether polyols include linear and/or branched polyethers which have a large number of ether bonds and at least two hydroxyl groups and preferably contain no further functional groups besides the hydroxyl groups. Examples of such suitable polyether polyols are polyoxyalkylene polyols such as polyethylene glycol, polypropylene glycol, polytetramethyl glycol and polybutyl glycol. In addition, homopolymers and copolymers of the polyoxyalkylene polyols mentioned and mixtures thereof can be used. Particularly suitable copolymers of the polyoxyalkylene polyols are those which comprise an adduct of at least one compound from the group consisting of ethylene glycol, propylene glycol, diethylene glycol, propylene glycol, triethylene glycol, 2-ethyl hexanediol-1,3-glycerol, 1,2,6-hexanetriol, trim ethylolpropane, trim ethylolethane, tris(hydroxyphenyl)propane, triethanolamine and triisopropylamine having at least one compound selected from the group consisting of ethylene oxide, propylene oxide and butylene oxide.

In a particularly preferred embodiment, the polyol is selected from the group consisting of polypropylene glycol, polytetramethyl glycol and random copolymers and/or block copolymers of ethylene oxide and propylene oxide.

In an alternatively preferred embodiment, the polyol is a polyester. Suitable polyester polyols can be formed, for example, by condensing one or more polyhydric alcohols having 2 to 15 carbon atoms with one or more polycarboxylic acids having 2 to 14 carbon atoms. Examples of suitable polyhydric alcohols include ethylene glycol, neopentyl glycol, glycerol, propylene glycols such as 1,2-propylene glycol and 1,3-propylene glycol, pentaerythritol, trimethylolpropane, 1,4,6-octanetriol, butanediol, pentanediol, in particular 1,4-pentanediol, hexanediol, dodecanediol, octanediol, chloropentanediol, glycerol monoallyl ether, glycerol monoethyl ether, diethylene glycol, 2-ethylhexanediol, 1,4-cyclohexanediol, 1,2,6-hexanetriol, 1,3,5-hexanetriol and 1,3-bis (2-hydroxyethoxy)propane.

Further polyester polyols which are used in the composition according to the invention can be formed on the basis of esters of glycerol with fatty acids. These esters are generally grouped together under the generic term "vegetable oils." Suitable compounds are, for example, linseed oil, soybean oil, rapeseed oil, sunflower oil, palm oil, safflower oil, fish oil and castor oil.

Particularly with regard to the processing properties of the polyester polyol used in the adhesive composition according to the invention, it has been found to be advantageous for the polyester polyol based on furandicarboxylic acid to have further functional units. An embodiment in which the polyester polyol is a polyester polyol based on a mixture of furandicarboxylic acid together with one or more further carboxylic acids is therefore preferred. The further carboxylic acid(s) is/are preferably aliphatic diacids. In particular, the further carboxylic acid(s) is/are selected from the group consisting of succinic acid, adipic acid, dodecanedioic acid, azelaic acid and sebacic acid and mixtures thereof, the acid preferably being obtained from renewable raw materials.

In a preferred embodiment of the invention, the polyol is a polyol which is obtained from renewable raw materials. In this way, the sustainability of the adhesive according to the invention can be further increased. In a particularly preferred embodiment, the polyol is therefore selected from the group consisting of ethylene glycol, diethylene glycol, triethylene glycol, 1,3-propanediol, 1,2-propanediol, 1,4-butanediol and 1,4-pentanediol. These are each compounds that can be obtained from renewable raw materials.

In a further preferred embodiment of the present invention, the polyester polyol used is obtained entirely from renewable raw materials. In order to further improve the environmental compatibility of the adhesive according to the invention, an embodiment is preferred in which the proportion of polyester polyol from renewable raw materials is at least 80 wt. %, preferably 90 wt. % and particularly preferably from 95 wt. % to 100 wt. %, in each case based on the total weight of the polyester polyols in the adhesive. It has surprisingly been found that, despite a high proportion of polyester polyol based on renewable raw materials, the mechanical and physical properties of the adhesive according to the invention are comparable to those of conventional adhesives of which the ingredients were prepared in the conventional manner from fossil sources.

B. Compound Containing NCO Groups

In addition to the polyester polyol, the adhesive according to the invention also contains a compound containing NCO groups. The compound containing NCO groups is preferably selected from the group consisting of polyisocyanates and NCO-containing prepolymers.

Within the meaning of the present invention, polyisocyanates are compounds which contain at least two active NCO groups, preferably diisocyanates or triisocyanates.

In a preferred embodiment, the compound containing NCO groups is selected from the group consisting of 1,5-naphthylene diisocyanate (NDI), 2,4'- or 4,4'-diphenylmethane diisocyanate (MDI), isomers of toluene diisocyanate (TDI), methylene triphenyl triisocyanate (MIT), hydrogenated MDI (H12MDI), tetramethylxylylene diisocyanate (TMXDI), 1-isocyanatomethyl-3-isocyanato-1,5,5-trimethylcyclohexane (IPDI), xylylene diisocyanate (XDI), hexane-1,6-diisocyanate (HDI), pentamethylene diisocyanate and dicyclohexylmethane diisocyanate, as well as oligomers and polymers thereof. Suitable NCO-containing prepolymers are reaction products of compounds bearing OH groups and/or NH groups with an excess of polyisocyanates, with no particular requirements being imposed on the polymers and polyisocyanates used. The polyisocyanates can be, for example, those mentioned above. Polyetheramines, for example, can be used as compounds bearing NH groups. The polyols listed above can be used as compounds bearing OH groups, and the prepolymer obtained can then be reacted further with a different or the same polyol.

An embodiment of the present invention in which the compound containing NCO groups is also prepared starting from renewable raw materials, such as pentamethylene diisocyanate, is particularly preferred. The pentamethylene diisocyanate is preferably used as a trimer.

The amount of compound containing NCO groups can be used to influence the reaction control of the conversion reaction with the polyester polyol. If the compound containing NCO groups is used in excess, polymer mixtures are formed which contain unreacted NCO groups. In this way, in particular compounds having a low molecular weight can be obtained. If, conversely, small amounts of compound containing NCO groups are used or if the reaction is carried out in stages, the molecular weight of the polymers obtained by comparison with the starting compounds can be increased. In a preferred embodiment, the amount-of-substance ratio of NCO:OH in the adhesive according to the invention is therefore from 1.2:1 to 2.9:1, preferably from 1.5:1 to 2:1.

Catalysts can be used to promote the reaction between the polyester polyol and the compound containing NCO groups and thus to accelerate the curing of the adhesive. An embodiment in which the adhesive according to the invention further contains a catalyst which is able to catalyze the reaction between the polyester polyol and the compound containing NCO groups is therefore preferred. The catalyst is preferably a metal compound of Sn, Ti, Fe, Zn, Bi, Hg, Pb or tertiary amines.

The catalyst is particularly preferably titanates such as tetrabutyl titanate and tetrapropyl titanate, tin carboxylates such as dibutlytin dilaurate (DBTL), dibutlytin diacetate, tin octoate, tin oxides such as dibutlytin oxide and dioctyltin oxide, organoaluminum compounds such as aluminum trisacetalacetonate, aluminum trisethylacetonate, chelate compounds such as titanium tetraacetylacetonate, amine compounds such as triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo-(5,4,0)-undecane-7 (DBU), 1,4-diazabicyclooctane (DABCO), 1,4-diazabicyclo[2,2,2]octane, N, N-dimethylpiperazine, 1,8-diazabicyclo[5,4,0]undec-7- ene, dimorpholinodimethylether, dimorpholinodiethylether (DMDEE) and mixtures thereof.

In this case, the amount of catalyst is preferably from 0.01 to 5 wt. %, particularly preferably from 0.05 to 2 wt. %, based on the total weight of the adhesive.

The adhesive according to the invention can additionally contain further components. It has been found to be advantageous for one or more further polyester polyols, in particular those based on aliphatic diacids, to be added to the adhesive. It has surprisingly been found that, in this way, in particular the viscosity of the adhesive can be correspondingly adjusted to the respective requirements. The polyester polyols based on aliphatic diacid are preferably those which are prepared on the basis of renewable raw materials. In a particularly preferred embodiment, the further polyester polyol is a polyester polyol based on an acid selected from the group consisting of succinic acid, adipic acid, dodecanedioic acid, azelaic acid and sebacic acid and mixtures thereof, the acid preferably being obtained from renewable raw materials.

In order to adapt the physical and mechanical properties of the adhesive to the respective requirements, additives can be added to the adhesive. These additives can be, for example, plasticizers, resins, stabilizers, pigments or fillers. There are no special requirements for the compounds used. However, preference is given to those compounds which are safe from the point of view of food safety and can preferably be prepared and/or have been prepared from renewable raw materials.

In a further preferred embodiment, the adhesive may also contain adhesion promoters. These can be, for example, polyolefinic adhesion promoters or silane adhesion promoters. The adhesion promoters used in the context of the present invention are preferably silane adhesion promoters, in particular organoalkoxysilanes such as am inosilanes, mercaptosilanes, epoxysilanes, vinylsilanes, (meth)acrylsilanes, isocyanatosilanes, carbamatosilanes, alkylsilanes, S-(alkylcarbonyl)mercaptosilanes and aldiminosilanes and oligomer forms of these silanes.

Depending on the application and field of application, it may be advantageous for the adhesive to contain a solvent. An embodiment in which the adhesive according to the invention contains solvents is therefore preferred. Suitable solvents are in particular those that evaporate at temperatures up to 120° C. The solvents can be selected from the group of aliphatic hydrocarbons, aromatic hydrocarbons, ketones or esters.

In other fields of application, however, the presence of solvents may be undesirable. An alternative embodiment in which the adhesive according to the invention is solvent-free is therefore preferred.

In another preferred embodiment, the adhesive is a water-based dispersion.

The adhesive according to the invention is preferably a low-viscosity adhesive.

The adhesive according to the invention therefore preferably has a viscosity in the range of from 200 to 10,000 mPas, preferably from 500 to 3,000 mPas, measured at from 10 to 60° C. using a Brookfield viscometer in accordance with EN ISO 2555. A viscosity in the specified range makes the adhesive according to the invention particularly suitable for bonding film substrates.

The adhesive according to the invention preferably has an application temperature of from 10 to 75° C., more preferably from 15 to 60° C. It has surprisingly been found that an application temperature in this range allows the adhesive according to the invention to be applied to large surface areas.

In addition to the usual requirements placed on adhesives with regard to their harmfulness to health, adhesives used in the production of food packaging are subject to special regulations. Not only does the adhesive itself have to be safe from the point of view of food safety, the content of by-products or decomposition products should also be as low as possible. A group of compounds that plays a role here is what are referred to as migratable compounds, i.e. compounds that can migrate through the packaging material into the packaged food. These compounds are mostly compounds that have no functionality and are therefore not integrated in the matrix composite. Cyclic ester compounds, which may be present in the polyester polyol component depending on production, are one such class of compounds. It has surprisingly been found that the number of cyclic esters in the polyester polyol can be reduced by using furandicarboxylic acid which has been prepared from renewable raw materials. For example, polyester polyols based on furandicarboxylic acid which are used in the present invention have a proportion of cyclic esters which is up to a factor of 10 lower than that of comparable polyester polyols based on fossil sources. An embodiment is therefore preferred in which the proportion of cyclic esters in the polyester polyol in the adhesive according to the invention is no more than 5,000 ppm, preferably no more than 4,000 ppm, particularly preferably between 0 and 3,500 ppm, the ppm relating to parts by mass.

The adhesive according to the invention is particularly suitable for bonding film-like substrates. Therefore, the present invention further relates to a method for bonding substrates, in particular film-like substrates. In the method according to the invention, the adhesive according to the invention is applied to at least one substrate and then joined together with at least one further substrate.

In a preferred embodiment, the substrates can be subject to pretreatment. In a further preferred embodiment, the substrates can be joined together under pressure.

It has surprisingly been found that the method according to the invention is also suitable for bonding metal substrates and printed surfaces. An embodiment in which at least one of the substrates has a metal surface or a printed surface is therefore preferred. If the substrate has a printed surface, the adhesive according to the invention is preferably applied to the surface of the substrate that is opposite the printed surface.

Food is usually packaged in films to extend the shelf life of the food and to preserve its taste and aroma. An embodiment of the method in which the adhesive is applied to a first film-like substrate and said substrate is then bonded to a second film-like substrate is therefore preferred. The film-like substrate can be, for example, a metal film or a film composite.

Not only can the sustainability of a substance be improved by preparing it from renewable raw materials, but also increasing the performance of the substance can contribute to sustainability, since the amount required can be thereby reduced. It has surprisingly been found that the required amount of adhesive according to the invention for bonding at least two substrates can be significantly reduced by comparison with conventional adhesives, without the adhesive effect being adversely affected. An embodiment of the method according to the invention in which the adhesive is applied to the substrate in an amount of from 1 to 100 g/m², preferably from 2 to 35 g/m², is therefore preferred.

The present invention further relates to an item which can be obtained using the method according to the invention. The item is preferably a film substrate which is bonded to the adhesive according to the invention. The item is particularly preferably food packaging.

The present invention further relates to a cured adhesive that can be obtained by curing the adhesive according to the invention. The curing can take place in a manner known to a person skilled in the art, for example by irradiation with light or in the presence of moisture. The present invention further relates to an item, preferably food packaging, which comprises the cured adhesive.

Furandicarboxylic acid is a common chemical compound that has a variety of uses. Furandicarboxylic acid which has been prepared from renewable raw materials is also known to a person skilled in the art. In the context of the present invention, it has been surprisingly found that furandicarboxylic acid from renewable raw materials can also be successfully used for preparing adhesives. Therefore, the present invention further relates to the use of furandicarboxylic acid from renewable raw materials for preparing adhesives.

EXAMPLES

The present invention is explained in detail with reference to the following examples, said examples not being intended to be considered to limit the inventive concept.

a) Measurement Methods

The acid number was determined in accordance with DIN EN ISO 2114.

The number of OH groups was determined in accordance with DIN 53240-2.

The viscosity was determined using Brookfield (Thermosel), spindle 27 at 10 revolutions/minute.

b) Starting Materials Used

Adipic acid, available from BASF SE, Germany 2,5-furandicarboxylic acid from renewable raw materials, for example available from Synvina C.V, the Netherlands Diethylene glycol from renewable raw materials, for example available from India-Glycols Ldt., India Desmodur L 75 and Desmodur N 3300, available from Covestro AG, Germany LOCTITE LIOFO L LA 7707 and LOCTITE LIOFOL LA 6707, available from Henkel AG & Co. KGaA, Germany 1. Synthesis of Polyester Polyol Based on Furandicarboxylic Acid (FDCA) Having a High FDCA Content 119 g of adipic acid (17.05 mol. %), 195.72 g of 2,5-furandicarboxylic acid from renewable raw materials (26.35 mol. %) and 286 g of diethylene glycol (56.6 mol. %) were mixed in a 1 L four-necked flask having a nitrogen inlet, thermocouple, stirrer and distillation arm. The mixture was heated to 200° C. under a stream of nitrogen and stirred for approximately 8 hours. The reaction mixture was then cooled and 0.02 wt. % of titanium isopropoxide, based on the total weight of the raw material, was added and the pressure of the reaction mixture was gradually reduced to 30 mbar in order to achieve a complete reaction. As soon as an acid number of 2 or less was reached, the reaction mixture was cooled. The polyester polyol obtained had the following properties:

Acid number: 1.4 mg KOH/g
OH number: 121 mg KOH/g
Viscosity: 12,000 mPas (measured at 50° C.)
115,000 mPas (measured at room temperature)
Molecular weight ($M_w$): 2,946 g/mol
Molecular weight ($M_n$): 1,898 g/mol
Polydispersity: 1.6 (measured by GPC).

The content of cyclic esters in the polyester polyol according to Example 1 and a conventional ester were compared. A polyester polyol based on isophthalic acid was selected for comparison. The GC-MS method was used to determine the proportion of cyclic esters.

The polyester polyol obtained according to Example 1 and the comparative polyester polyol were each weighed out in headspace vials and mixed with 99.8% ethanol. The containers were then tightly sealed and the samples were extracted at 70° C. for 2 hours. 1 ml was then taken from each of the extracts, mixed with an internal standard (naphthalene-D8) and measured using GC-MS. Approximately 1 g of substance was extracted per sample. Identification was carried out with respect to naphthalene-D8 with a response factor 1 (RF=1). The results are summarized in Table 1.

TABLE 1

| Sample | Cycle type | Cycle concentration |
|---|---|---|
| Reference | 2AA + 2DEG | 2,000 ppm |
| | AA + DEG | 3,500 ppm |
| | AA + IA + 2DEG | 6,200 ppm |
| | 2IA + 2DEG | 4,000 ppm |
| Example 1 | 2AA + 2DEG | 330-510 ppm |
| | AA + DEG | 900 ppm |
| | AA + FDCA + 2DEG | 820-940 ppm |
| | 2FDCA + 2DEG | 410 ppm |

AA: adipic acid
DEG: diethylene glycol
IA: isophthalic acid
FDCA: furandicarboxylic acid As can be seen from Table 1, the proportion of cyclic esters in the polyester polyol according to Example 1 is significantly lower than that in the comparative sample. In the comparative sample, an amount of cyclic esters of 15,700 ppm was found, whereas the amount of cyclic esters was between 2,460 and 2,760 ppm in the polyester polyol according to Example 1.

2. Synthesis of Polyester Polyol Based on Furandicarboxylic Acid (FDCA) Having a Low FDCA Content 205 g of adipic acid (41 mol. %), 16 g of 2,5-furandicarboxylic acid from renewable raw materials (2.92 mol. %), 53 g of 1,2-propylene glycol (20.35 mol. %) and 130 g of diethylene glycol (35.73 mol. %) were mixed in a 1 L four-necked flask having a nitrogen inlet, thermocouple, stirrer and distillation arm. The mixture was heated to 200° C. under a stream of nitrogen and stirred for approximately 8 hours. The reaction mixture was then cooled and 0.02 wt. % of titanium isopropoxide, based on the total weight of the raw material, was added and the pressure of the reaction mixture was gradually reduced to 30 mbar in order to achieve a complete reaction. As soon as an acid number of 2 or less was reached, the reaction mixture was cooled. The polyester polyol obtained had the following properties:

Acid number: 0.2 mg KOH/g
OH number: 124 mg KOH/g
Viscosity: 2,400 mPas (measured at room temperature)
Molecular weight ($M_w$): 3,094 g/mol
Molecular weight (Mn): 1,779 g/mol
Polydispersity: 1.7 (measured by GPC).

3. Laminating Adhesive I

Stage 1:

79.33 g of ethyl acetate and 91.06 g of the polyester polyol from Example 1 were placed in a reactor and mixed. Once there was a homogeneous mixture, a sample was taken to determine the water content. The water content should be <300 ppm.

4,4'-MDI (addition ratio 4,4'-MDI:polyester polyol=amount of substance NCO:OH=1.9:1; NCO content 4,4'-MDI=33.5%) was added to the mixture and reacted for 2.75 hours at 78° C. After the theoretical NCO content (1.85% [+/−0.1%]) had been reached, the temperature was lowered by switching on the cooling device and cooling to below 75° C.

Stage 2:

As soon as a temperature below 75° C. had been reached, 2.14 g of a silane adhesion promoter, 0.98 g of an aromatic trifunctional isocyanate (Desmodur L 75) and 4.02 g of an aliphatic trifunctional isocyanate (Desmodur N3300) were added and the mixture was cooled further.

The mixture was homogenized for 15 minutes and a sample was taken to determine the NCO content (NCO desired value stage 2: 2.35%). Then the mixture was cooled further to a temperature of from 50° C. to 40° C. and poured into prepared containers.

Film Lamination

Film samples of DIN A4 size were coated with the adhesive using a wire doctor blade, the solvent was evaporated in a drying cabinet and the films were laminated using a roll laminator. A PET/Al/cPP composite was produced, the adhesive being in the Al/cPP position. The plastics coating was 3.5 g/m². The bond strength after curing (14 days at room temperature) was 3.6/3.7 N/15 mm.

The bond strength after sterilization (45 minutes at 134° C. after curing) was 4.6/4.7 N/15 mm, which meets the market requirements stipulating that the bond strength has to be more than 4 N/15 mm.

4. Laminating Adhesive II

The polyester polyol according to Example 2 was mixed with LA 7707 in the ratio specified above.

The laminating adhesive LOCTITE LIOFOL LA 7707/LA 6707 was selected as a reference.

LA 7707:

Basic component: NCO-terminated prepolymer based on PPG400, PPG1000, castor oil and 4,4'-MDI.

NCO content: 12-12.6%

Viscosity: 3,000-5,000 mPas (measured at 40° C.)

LA 6707:

Hardener component: OH-functional, based on 100% polyester PES 218

OH number: 135+/−6 mg KOH/g

Viscosity: 2,000-3,000 mPas (measured at 20° C.)

Mixing ratio LA7707/LA 6707 by weight: 100:75 (NC 0:0H~1.6)

For the polyester comparison, the component LA 7707, which had been preheated to 40° C., was successively mixed once in each case with LA 6707 and the polyester polyol according to Example 2 and homogenized by hand for approximately 1 minute. For this purpose, 500 g LA 7707 was weighed and mixed with 375 g LA 6707 and 425 g polyester polyol according to Example 2 such that there was an NCO:OH ratio of approximately 1.6. The mixture was poured into the roll nip of a laminating machine (polytype, testing machine). A PET film on which 2 g of adhesive mixture was applied per 1 m² was used as a carrier film. A PE film was then fed in and the resulting PET/PE laminate was wound up.

The composite was stored at room temperature and the bond strength of samples from the rolls was determined after certain periods of time.

Sealed seam adhesion was determined after 14 days. In addition, the samples were subject to what is referred to as a crease test, during which the samples were tightly bent after certain time intervals, fixed with a paper clip and stored in the oven at 80° C. for one hour.

DIN A4-sized samples were selected for testing the composite. Said samples were folded once in all directions (upward, to the right, downward, to the left) such that the edges were one on top of the other and a folded end piece of an area of approximately 5 cm×7.5 cm was produced. The edges were pressed with light pressure using a ruler. The four-fold composite was fixed with a paper clip and stored in the oven at 80° C. for one hour. The samples were then removed from the oven, unfolded and visually inspected. If delaminations could be identified, the test had to be assessed as having failed. If the samples passed the crease test, the bond strength is so advanced that the laminate can withstand mechanical and thermal loads.

The results of the tests are summarized in Table 2:

TABLE 2

| | Comparison | According to the invention |
|---|---|---|
| Bond strength [N/15 mm] | | |
| 1 day | 2.5 | 2.2 |
| 2 days | 2.8 | 3.0 |
| 3 days | 3.0 | 3.2 |
| 4 days | 3.4 | 3.4 |
| 7 days | 3.3 | 3.3 |
| 14 days | inseparable | inseparable |
| Sealed seam [N/15 mm] | | |
| 14 days | 38 | 41 |
| Crease test | | |
| 1 day | inadequate | inadequate |
| 2 days | OK | OK |

As can be seen from the table, the adhesive according to the invention exhibits satisfactory results which are comparable to, or partially exceed, those of a conventional adhesive.

The invention claimed is:

1. An adhesive for bonding plastics and/or metal substrates, the adhesive comprising at least one compound containing NCO groups and a polyester polyol; wherein the polyester polyol is the reaction product of—furandicarboxylic acid (FDCA), one or more aliphatic diacids and one or more polyols obtained from renewable raw materials, wherein the one or more polyols is selected from the group consisting of ethylene glycol, diethylene glycol, triethylene glycol, 1,3-propanediol, 1,2-propanediol, 1,4-butanediol, 1,4-pentanediol and a mixture thereof, and the furandicarboxylic acid is obtained from renewable raw materials and the adhesive has a viscosity in the range of from 200 to 10,000 mPas, measured at 10 to 60° C., using a Brookfield viscometer, in accordance with EN ISO 2555.

2. The adhesive according to claim 1, wherein the one or more aliphatic diacids are obtained from renewable raw materials and the one or more aliphatic diacids are selected from the group consisting of succinic acid, adipic acid, dodecanedioic acid, azelaic acid, and sebacic acid, and mixtures thereof.

3. The adhesive according to claim 1, wherein the polyester polyol is obtained entirely from renewable raw materials.

4. The adhesive according to claim 1, wherein the proportion of polyester polyol from renewable raw materials is at least 80 wt. %, based on the total weight of the polyester polyols in the adhesive.

5. The adhesive according to claim 1, wherein the compound containing NCO groups is a polyisocyanate having two or more isocyanate groups.

6. The adhesive according to claim 1, wherein the compound containing NCO groups is selected from the group consisting of 1,5-naphthylene diisocyanate (NDI), 2,4'- or 4,4'-diphenylmethane diisocyanate (MDI), isomers of toluene diisocyanate (TDI), methylene triphenyl triisocyanate (MIT), hydrogenated MDI (H12MDI), tetramethylxylylene diisocyanate (TMXDI), 1-isocyanatomethyl-3-isocyanato-1,5,5-trimethylcyclohexane (IPDI), xylylene diisocyanate (XDI), hexane-1,6-diisocyanate (HDI), pentamethylene diisocyanate and dicyclohexylmethane diisocyanate, and oligomers and polymers thereof.

7. The adhesive according to claim 1, wherein the compound containing NCO groups is an NCO-terminated prepolymer that is a reaction product of a polyisocyanate and a polyol.

8. The adhesive according to claim 1, wherein the adhesive is present as a water-based dispersion.

9. The adhesive according to claim 1, wherein the one or more polyols are selected from diethylene glycol, 1,2-propanediol, and mixtures thereof; and the one or more aliphatic diacids is adipic acid.

10. The adhesive according to claim 1, wherein the adhesive is moisture curable.

11. The adhesive according to claim 1, wherein the at least one compound containing NCO groups and the polyester polyol are used at an NCO:OH ratio from 1.2:1 to 2.9:1 to provide an adhesive having active NCO groups.

12. A method for bonding at least two substrates, wherein an adhesive according to claim 1 is applied to at least one substrate and said substrate is then joined together with at least one further substrate.

13. The method according to claim 12, wherein at least one of the substrates has a metal surface or a printed surface.

14. The method according to claim 12, wherein the adhesive is applied to a first film-like substrate and said substrate is then bonded to a second film-like substrate.

15. The method according to claim 12, wherein the adhesive is applied in an amount of from 1 to 100 g/m$^2$.

* * * * *